United States Patent
Richter et al.

(10) Patent No.: US 8,168,323 B2
(45) Date of Patent: May 1, 2012

(54) BATTERY COVER

(75) Inventors: Gerolf Richter, Hildesheim (DE); Peter Streuer, Hannover (DE); Olaf Sielemann, Brachttal (DE); Hans-Heinrich Schirmer, Rodenberg (DE)

(73) Assignee: VB Autobatterie GmbH & Co. KGaA, Hannover (DE)

( * ) Notice: Subject to any disclaimer, the term of this patent is extended or adjusted under 35 U.S.C. 154(b) by 1006 days.

(21) Appl. No.: 11/526,216

(22) Filed: Sep. 22, 2006

(65) Prior Publication Data

US 2007/0122696 A1 May 31, 2007

(30) Foreign Application Priority Data

Sep. 27, 2005 (DE) .................. 10 2005 046 256

(51) Int. Cl.
*H01M 2/04* (2006.01)
*H01M 2/08* (2006.01)
*H01M 2/30* (2006.01)
*H01M 6/42* (2006.01)

(52) U.S. Cl. ........ 429/181; 429/180; 429/182; 429/184; 429/175; 429/149

(58) Field of Classification Search .............. 429/183, 429/180, 179, 176, 79, 178, 84, 123, 185, 429/181, 182, 184, 149, 175; 72/126; 156/315
See application file for complete search history.

(56) References Cited

U.S. PATENT DOCUMENTS

| | | | |
|---|---|---|---|
| 1,484,306 A * | 2/1924 | MacKenzie | 429/183 |
| 2,052,499 A | 8/1936 | Strough | |
| 2,066,597 A | 1/1937 | West | |
| 2,414,210 A * | 1/1947 | Quirk | 429/84 |
| 2,575,076 A * | 11/1951 | Smyth | 156/315 |
| 3,242,012 A | 3/1966 | Sabatino | |
| 3,671,325 A * | 6/1972 | Mocas | 429/79 |
| 3,908,739 A | 9/1975 | Cushman | |
| 4,164,609 A * | 8/1979 | Jensen | 429/183 |
| 4,522,899 A | 6/1985 | Illmann et al. | |
| 4,645,725 A * | 2/1987 | Kump et al. | 429/179 |
| 4,775,604 A | 10/1988 | Dougherty et al. | |
| 4,859,547 A | 8/1989 | Adams et al. | |

(Continued)

FOREIGN PATENT DOCUMENTS

DE   1 213 904   4/1966

(Continued)

OTHER PUBLICATIONS

"The Storage of Electrical Energy", Gaston Plante, 1859, p. 31-34.*

(Continued)

*Primary Examiner* — Jonathan Crepeau
*Assistant Examiner* — Kenneth Douyette
(74) *Attorney, Agent, or Firm* — Boardman & Clark LLP

(57) ABSTRACT

A plastic battery cover for closing a battery housing includes a top surface, a bottom surface, at least one terminal extending through the battery cover, and a connecting flank extending from the at least one terminal, the connecting flank in contact with the battery cover. The connecting flank is configured such that a region between the at least one terminal and the top surface of the battery cover is adapted to prevent the formation of a gap between the terminal and the adjacent portion of the battery cover after the volume reduction of the plastic in this region during the manufacture of the battery cover by injection molding.

23 Claims, 3 Drawing Sheets

U.S. PATENT DOCUMENTS

| | | | |
|---|---|---|---|
| 4,879,191 | A | 11/1989 | Sindorf |
| 4,934,046 | A | 6/1990 | Sindorf |
| 5,281,493 | A | 1/1994 | Jones |
| 5,549,986 | A | 8/1996 | Heiman et al. |
| 5,599,641 | A | 2/1997 | Ching, Jr. et al. |
| 5,786,108 | A | 7/1998 | Sprengel et al. |
| 6,008,480 | A | 12/1999 | Lund |
| 6,030,723 | A | 2/2000 | Nagano et al. |
| 6,255,617 | B1 | 7/2001 | Farmer et al. |
| 6,258,481 | B1 | 7/2001 | Ross et al. |
| 6,300,007 | B1 | 10/2001 | Klevanov et al. |
| 6,309,429 | B1 | 10/2001 | Lund et al. |
| 6,312,852 | B1 | 11/2001 | Wagner |
| 6,475,659 | B1 | 11/2002 | Heimer |
| 6,573,723 | B2 | 6/2003 | Baston |
| 6,644,084 | B1 * | 11/2003 | Spiegelberg .............. 72/126 |
| 6,803,146 | B2 | 10/2004 | Key et al. |
| 6,806,000 | B2 | 10/2004 | Misra et al. |
| 2002/0114994 | A1 | 8/2002 | Yabuki et al. |
| 2003/0017392 | A1 | 1/2003 | Key et al. |
| 2003/0082440 | A1 * | 5/2003 | Mrotek et al. ............ 429/123 |
| 2003/0224248 | A1 | 12/2003 | Spiegelberg et al. |
| 2004/0170892 | A1 | 9/2004 | Popp |
| 2004/0191621 | A1 | 9/2004 | Heller, Jr. |
| 2006/0127759 | A1 | 6/2006 | Bechtold et al. |

FOREIGN PATENT DOCUMENTS

| | | |
|---|---|---|
| DE | 1 671 999 | 11/1971 |
| DE | 1671999 B1 | 11/1971 |
| DE | 2 263 409 | 7/1973 |
| DE | 32 30 628 C1 | 12/1983 |
| DE | 3230628 C1 | 12/1983 |
| DE | 42 41 393 C2 | 7/1994 |
| EP | 0601268 | 6/1994 |
| EP | 0601268 A1 | 6/1994 |
| EP | 1347522 A1 | 9/2003 |
| GB | 1 245 255 | 11/1967 |
| GB | 1 421 652 | 1/1976 |
| JP | 58154164 A * | 9/1983 |
| WO | WO 99/07029 A | 2/1999 |
| WO | WO 2004/114436 A2 | 12/2004 |

OTHER PUBLICATIONS

Abstract of JP 58154164, Sep. 1983, Niki et al.*
Machine translation of EP 0601268, Jun. 1994, Heller.*
European Search Report for EPO Appln. No. EP06019138.4-1227 dated Nov. 2, 2007.
European Office Action for EPO Appln. No. EP 06 019 138.4-2119 dated Apr. 11, 2011.

* cited by examiner

BATTERY COVER

CROSS-REFERENCE TO RELATED PATENT APPLICATIONS

The present application claims the benefit of German Priority Application DE 10 2005 046 256.1-45, filed Sep. 27, 2005, the disclosure of which is incorporated herein by reference in its entirety, including the specification, drawings, claims and abstract thereof.

BACKGROUND

The present invention relates to covers for batteries (e.g., lead-acid starting, lighting and ignition batteries).

During the manufacture of batteries, a particular problem is posed by the design of leadthroughs, for example for terminals and cell connectors, which are tight and remain tight. It has to be possible to manufacture the leadthroughs inexpensively and simply, and said leadthroughs have to withstand the highly creepable electrolyte. For this purpose, lead bushings are usually pressed or injection molded into the battery cover or into the cell walls as terminal leadthroughs.

It is desirable to maintain a fixed seat despite the different coefficients of thermal expansion of metal and plastic. In addition, there are further problems as a result of the presence of acid inside and during battery manufacture.

DE 1 671 999 describes a terminal leadthrough in the form of a lead bushing having labyrinth rings, in which circumferential or interrupted undercuts are provided in the labyrinth rings. The labyrinth rings have antirotation safeguards on their external diameters. The required seal for gas and acid is achieved firstly by the welding of the terminals to the terminal bushes and secondly by the encapsulation of the lower part of the terminal sleeve by injection molding. The sealing action between the plastic and the terminal sleeve is achieved by the labyrinthine configuration with (metallically smooth) surfaces which are as smooth as possible in interaction with the three-dimensional shrinkage of the plastic during the manufacture of the battery covers by injection molding.

DE 42 41 393 C2 has disclosed a terminal for an accumulator, in which the ribs of the labyrinth are configured in a barb-shaped manner. They do not therefore lose their sealing action over a broad temperature interval, even in the case of heating.

In this context, an embedding process has proved itself, in which the plastic injection molding point lies in the vicinity of the terminal leadthrough, with the result that this zone solidifies last and therefore ensures optimum pressing shrinkage of the plastic. In order to give this type of terminal bushing leadthrough a certain resistance against twisting rotation, the terminal bushings are provided on the outside on the surface with a toothing system which is incorporated into the sleeve ring, at the level of the battery.

There is then a problem in that, in the region of the joint or separating line between the plastic and the metal which is situated in each case at the end of the terminal bush labyrinth, three-dimensional shrinkage cannot be ensured. This is true, in particular, for the outwardly oriented surface of the battery cover with the region of the antirotation protection means which is already problematic for two-dimensional sealing shrinkage of the plastic.

The consequence is penetration of acid, even if only brief and limited spatially, in a gap of only micrometers in width, and the acid remaining despite very intensive attempts at cleaning.

If, after installation of the battery into the vehicle, the terminal clamp is placed onto the terminal bushing and screwed for electric contact, acid can penetrate into the basic material brass if water is present, on account of tears in the tin plating of the terminal. This leads to the brass basic body of the terminal clamp being decomposed by the release of zinc.

In order to solve this problem, the terminal bushing labyrinth which is to be injection molded later with plastic can be treated in advance with an adhesion promoter or by a powder coating. However, this leads to higher costs.

Manufacture of this type of a gastight and liquidtight terminal seal of a lead accumulator is disclosed in DE 32 30 628 C1 and DE 1 213 904 A. There, the terminal surface is coated with a sealing substance or an adhesive, onto which rubber is applied.

DE 2 263 409 discloses an accumulator battery having end terminals which are configured in one piece, are placed into a casting mold as an insert and are also injection molded into the plastic of the plastic cover during the injection molding process. The end terminal is provided with a flange for sealing purposes.

It would be advantageous to provide an improved plastic battery cover to provide an improved transition between the plastic and the terminal element. It would also be advantageous to provide a battery that incorporates such a battery cover.

SUMMARY

An exemplary embodiment of the invention relates to a plastic battery cover for closing a battery housing that includes a top surface, a bottom surface, at least one terminal extending through the battery cover, and a connecting flank extending from the at least one terminal. The connecting flank is in contact with the battery cover, and is configured such that a region between the at least one terminal and the top surface of the battery cover is adapted to prevent the formation of a gap between the terminal and the adjacent portion of the battery cover after the volume reduction of the plastic in this region during the manufacture of the battery cover by injection molding.

Another exemplary embodiment of the invention relates to a lead-acid battery that includes a plastic housing subdivided into cells, a plurality of electrode plates in the cells of the plastic housing, and an electrolyte provided in the cells. A plastic battery cover is coupled to the housing that includes a upper surface, a lower surface, at least one terminal extending through the battery cover, and a connecting flank extending from the at least one terminal. The connecting flank is in contact with the battery cover, and is configured such that a region between the at least one terminal and the upper surface of the battery cover is adapted to prevent the formation of a gap between the terminal and the adjacent portion of the battery cover after the volume reduction of the plastic in this region during the manufacture of the battery cover by injection molding

BRIEF DESCRIPTION OF THE DRAWINGS

In the following text, the invention will be explained in greater detail by way of exemplary embodiments using the appended drawings, in which.

DETAILED DESCRIPTION

Figure 1:
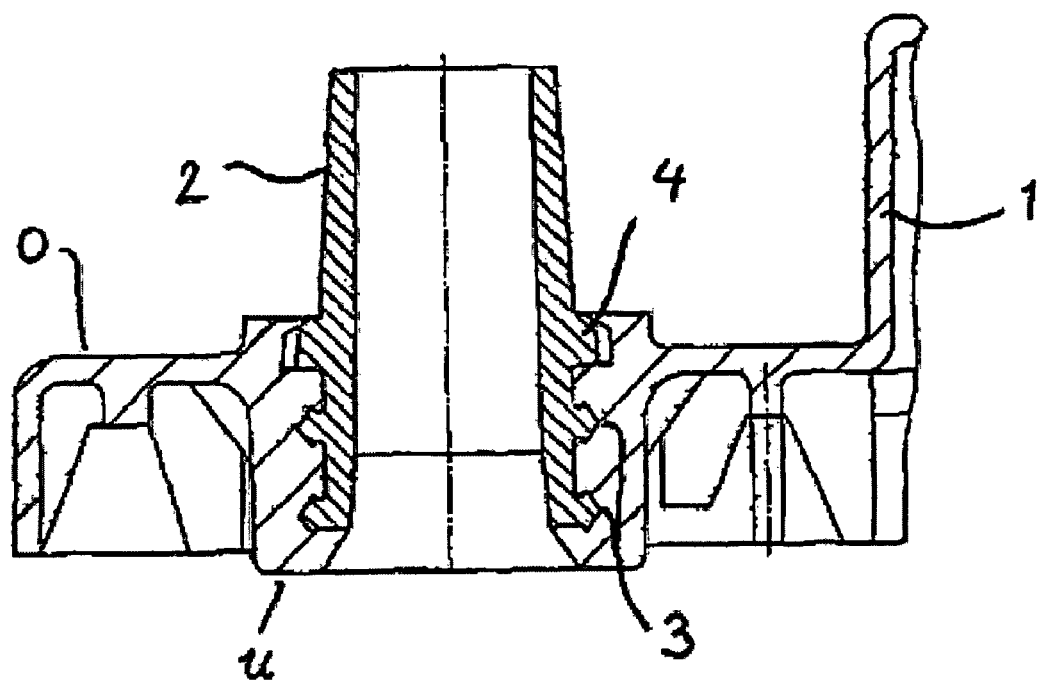
FIG. 1 shows a sectional view of a portion of a battery cover having a terminal element which has beveled connecting flanks.

According to an exemplary embodiment, a plastic battery cover for closing a battery housing includes an underside which points into the battery housing in the state where it is fitted onto the battery housing, and an upper side which lies opposite, and having at least one metallic terminal element which is guided through the battery cover. Such a battery cover may be used with a lead battery that includes a plastic housing which is subdivided into cells, a multiplicity of electrode plates in the cells of the plastic housing, and electrolyte provided within the cells.

According to an exemplary embodiment, the region between the at least one terminal element and the upper side of the battery cover is adapted in such a way that a gap between the terminal element and the adjacent plastic of the battery cover on the upper side is prevented after the volume reduction of the plastic in this region during the manufacture of the battery cover by injection molding. In the construction according to this embodiment, the three-dimensional shrinkage (i.e., the volume reduction in the plane of the battery cover and in the direction between the upper side and the lower side of the battery cover) is therefore used in order to ensure a gapfree connection between the battery cover and the terminal element.

One particularly simple embodiment provides for the connecting flank which protrudes in each case from the circumferential of a terminal element and is arranged in a manner which adjoins the surface of the battery cover to have an at least partially circumferential groove on its outer circumference. During manufacture of the battery cover by injection molding, plastic penetrates into the groove, with the result that the depth of a gap which is possibly produced on the separating line between the metal of the terminal element and the plastic of the battery cover is reduced.

This can be achieved by a change in the labyrinth geometry, with the aim of also using the three-dimensional shrinkage of the plastic during manufacture of the battery cover by injection molding at the separating line between the plastic of the battery cover and the metal of the terminal element which is situated on the outer side of the battery.

One particularly simple embodiment provides for the at least one terminal element to have, on the circumference of the terminal element, a connecting flank which protrudes from the terminal element in the direction of the battery cover and is beveled with respect to the upper side of the battery cover, and for plastic to rest on the inclined upper side of the connecting flank. The connecting flank which extends obliquely away from the terminal element in the direction of the underside results in the plastic which rests on the upper side of the connecting flank always merging flushly into the connecting flank without leaving a gap during shrinkage.

A further embodiment provides a circumferential notch in the region of the terminal element which adjoins the upper side of the battery cover, for accommodating plastic. The plastic which is present in the notch during manufacturing by injection molding also still fills said notch sufficiently in the case of volume reduction, in order to ensure a gapfree, flash connection of the battery cover to the terminal element.

Another embodiment provides a barb-shaped undercut of a connecting flank which protrudes at the circumference of the terminal element, for accommodating plastic in the undercut and avoiding a gap between the terminal element and the upper side of the battery cover. The barb-shaped undercut also ensures that plastic which collects in the undercut during manufacturing by injection molding still remains at least partially in the undercut after the volume reduction and a gapfree connection of the plastic battery cover to the terminal element is ensured on account of the shrinkage of the plastic.

It has also proven advantageous if the outer face of the connecting element is not metallically smooth, but roughened. To this end, the outer face can be, for example, corrugated, scored, scaled or scarred. The optimum degree of roughness which is determined according to VDI guidelines should lie in the range of the roughness stages 36 to 50 and preferably 39 to 42.

However, it is also conceivable to provide in each case one separate plastic ring which is pressed on the circumference of the associated terminal element, in order to ensure the spacing of an annular gap between the plastic battery cover and the terminal element. The connecting region between the plastic battery cover and the terminal which is problematic on account of the volume reduction of plastic during manufacturing by injection molding is therefore moved to the outer circumference of the annular spacer which is made from plastic.

In the abovementioned embodiments, the connecting flank can be configured as an antirotation protection means having two or more fingers which protrude on the circumference of the terminal element. That is to say, a gap at the transition between the plastic battery cover and the terminal element is prevented by the structural design of the antirotation protection means.

However, as an alternative to this, it is also possible to provide an annular plastic bead which surrounds the terminal as part of the battery cover, having a size of approximately from 0.5 to 1.5 mm. This plastic annular bead which is formed integrally with the battery cover during manufacturing by injection molding adjoins the associated terminal element and encloses the latter.

In order that no moisture is collected or backs up within this annular region, it is advantageous if the annular bead has slots at at least one location. Slots having a width of at least approximately 2 mm are advantageous, in conjunction with an inner face which is inclined with respect to the plastic annular bead, that is to say is slightly conical. Hemispherical spacers are also conceivable in addition to the annular bead elements.

In FIG. 1, a sectional view of a portion of a battery cover 1 can be seen, which battery cover 1 is manufactured from polypropylene polypropylene (PP) using injection molding technology. During manufacturing by injection molding, a terminal element 2 in the form of a terminal sleeve is injection molded into the battery cover 1. The terminal element 2 has circumferential projections 3 having a barb-shaped profile. A circumferential connecting flank 4 which at the same time forms an antirotation protection means is provided in the region of the outer face of the battery. For this purpose, the connecting flank 4 is configured with two or more fingers which protrude from the circumference of the terminal element 2.

The connecting flank 4 has a surface which is inclined, that is to say beveled, from the terminal element 2 in the direction of the underside U of the battery cover, with the result that plastic of the battery cover 1 which rests on the surface migrates downward on the inclined surface of the connecting flank 4 during the volume reduction which occurs in the injection molding manufacturing process. Here, the inclined shape of the connecting flank 4 ensures that there is a gapfree transition between the plastic of the battery cover 1 and the connecting flank 4 on the upper side O of the battery cover 1.

Figure 2:
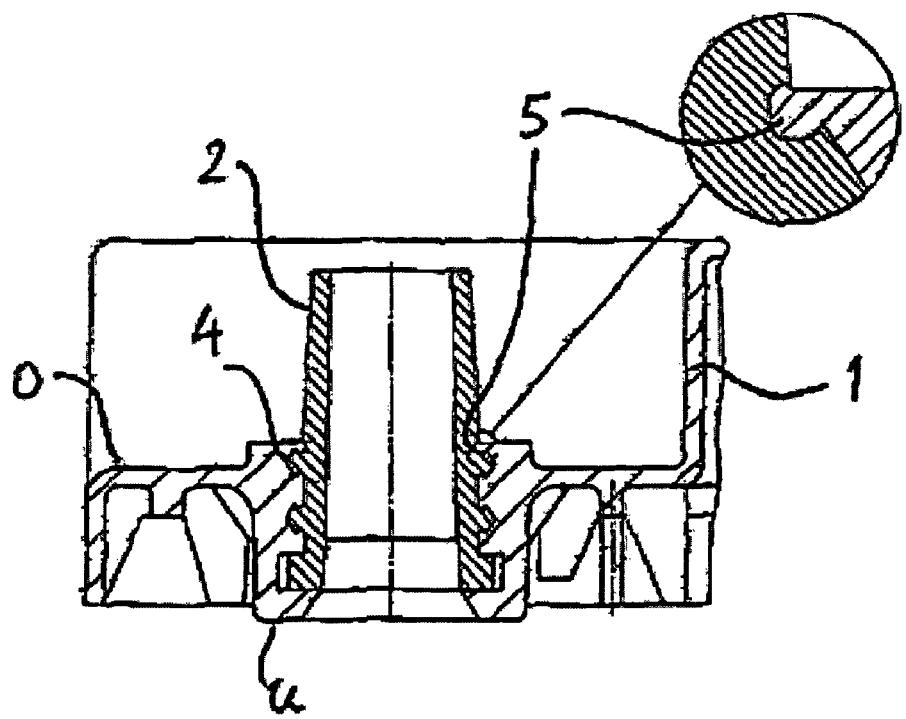
FIG. 2 shows a sectional view of a portion of a battery cover having a notch in the terminal element, and an enlarged illustration of a detail of the notch.

In FIG. 2, another embodiment can be seen, in which a notch 5 which extends around the entire outer circumference of the terminal element 2 is provided in a manner which adjoins a barb-shaped connecting flank 4. During manufacturing by injection molding, plastic penetrates into the notch 5 and becomes hooked there during the shrinking process in manufacturing by injection molding, with the result that a gapfree transition is ensured between the terminal element 2 and the upper side of the battery cover.

Figure 3:
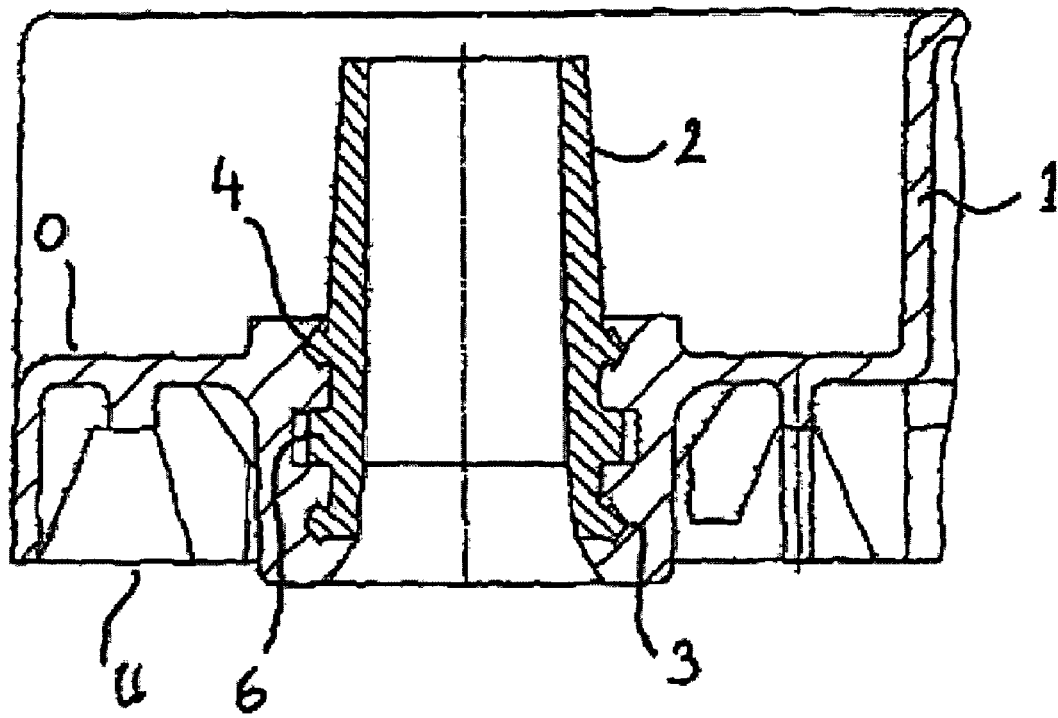
FIG. 3 shows a sectional view of a portion of a battery cover having a connecting flank of a terminal element, which connecting flank is undercut in a barb-shaped manner.

In FIG. 3, another embodiment can be seen, in which only one connecting flank 4 is provided which is covered by the plastic battery cover 1 on the upper side O and has a barb-shaped profile. As a result of the barb-shaped profile, the plastic also becomes hooked during the shrinking process in the separating line between the terminal element 2 and the connecting flank 4, with the result that once again a gapfree transition is ensured between the terminal element 2 and a plastic battery cover 1 on the outer side of the battery.

The battery protection means 6 is moved from the upper side O of the battery cover 1 into the central region between the upper side O and the lower side U of the battery cover 1.

Figure 4:
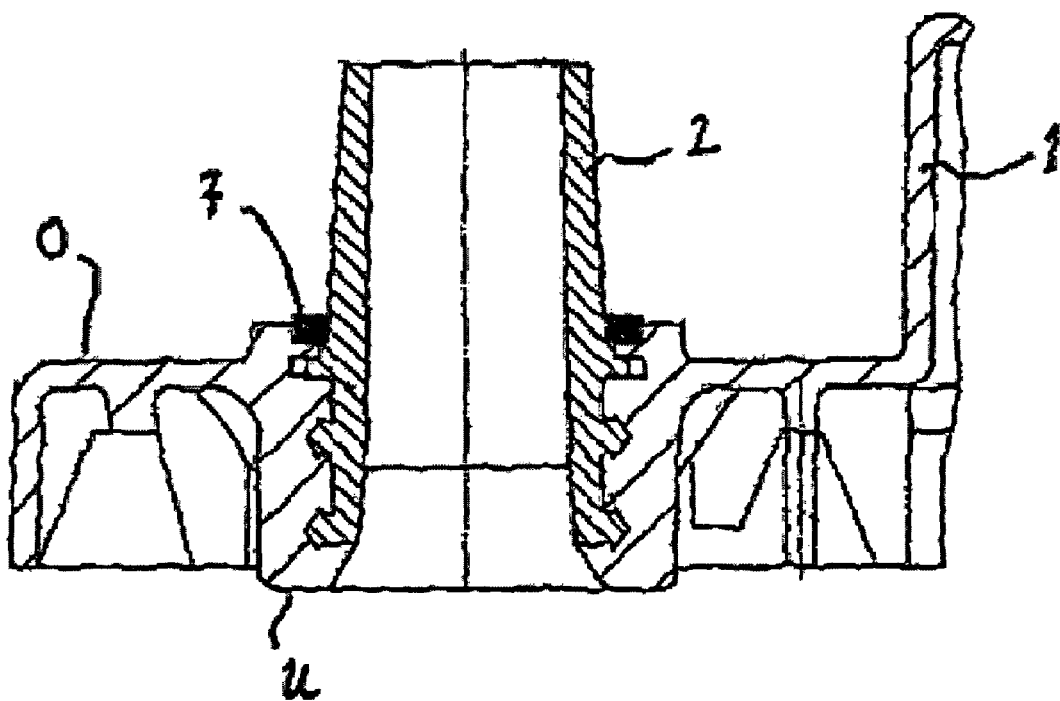
FIG. 4 shows a sectional view of a portion of a battery cover having a plastic ring which is pressed onto the circumference of the terminal element.

In FIG. 4, a sectional view of a portion of another embodiment of a battery cover 1 can be seen, in which a plastic ring 7 is pressed onto the terminal element 2. Said plastic ring 7 protrudes from the upper side of the battery cover 1 by from approximately 0.5 to 1.5 mm and therefore forms an annular spacer. The critical region of the separating line between the terminal element 2 and a plastic battery with cover 1 is moved to the outer circumference of the plastic ring 7 by the plastic ring 7.

In order that no moisture collects or backs up within the annular region, it is advantageous if the plastic ring 7 has slots at at least one location. Here, slots having a width of at least approximately 2 mm are advantageous, in conjunction with an inner face which is inclined with respect to the plastic ring 7, that is to say is slightly conical.

Figure 5:
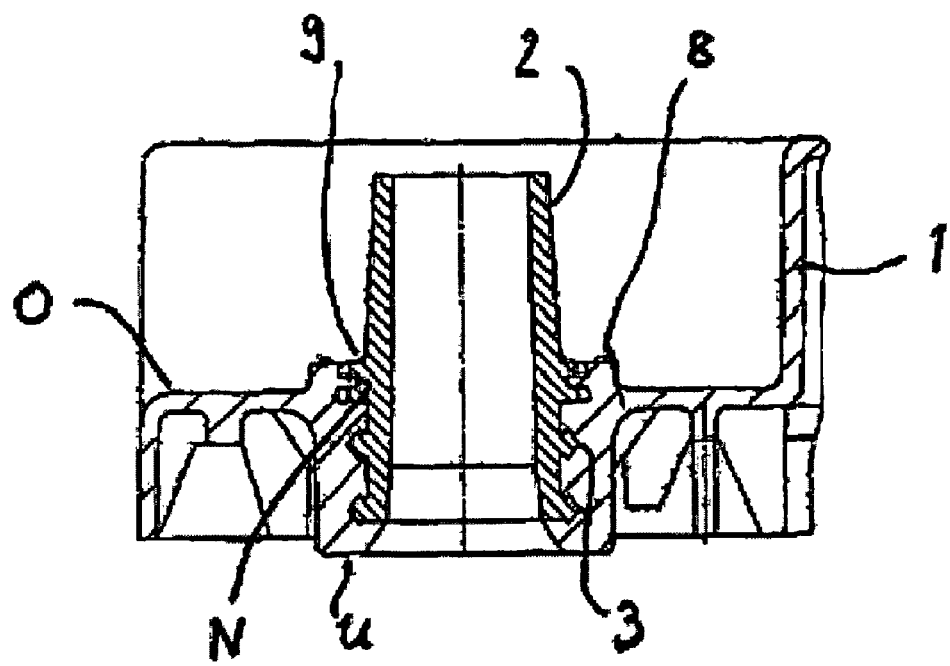
FIG. 5 shows a sectional view of a portion of a battery cover having hemispherical spacers on the terminal element and the upper side of the battery cover.

In FIG. 5, another embodiment of the battery cover 1 can be seen in a sectional view of a portion of the cover. Instead of an annular bead element (e.g., instead of the plastic ring 7 from FIG. 4), hemispherical spacers 8 which are made from plastic are formed integrally with the plastic battery cover 1 at a spacing from one another on a circular circumference on the upper side O of the battery cover 1. Bead-like spacers 9 are likewise arranged on the terminal element 2. This prevents a direct mechanical contact of terminal clamps which are clamped to the terminals with possible electrolyte which is situated in a gap between the terminal element 2 and the plastic battery cover 1, and therefore avoids or delays terminal clamp corrosion.

Furthermore, a groove N can be seen which is circumferential on the outer circumference of the connecting flank 4 and into which plastic penetrates during manufacturing by injection molding, with the result that the depth is reduced of a gap which is possibly produced on the separating line between the metal and the plastic. The groove N can also be introduced separately or in conjunction with other embodiments.

Figure 6:
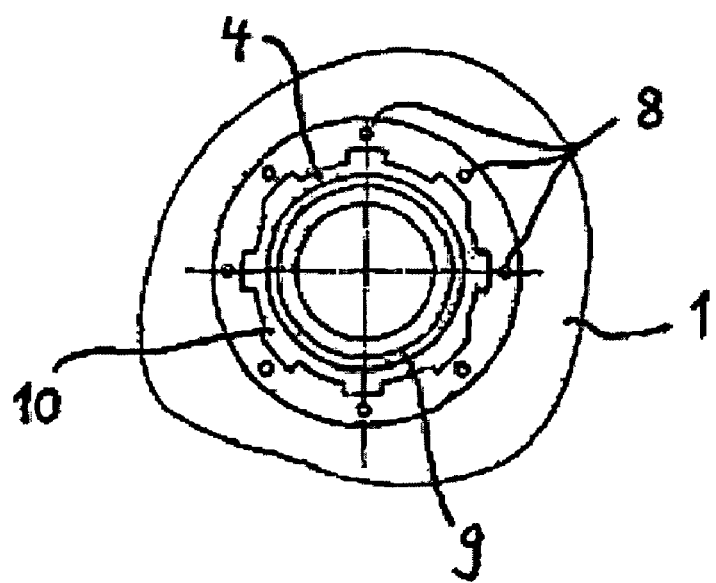
FIG. 6 shows a plan view of a portion of the battery cover shown in FIG. 5.

In FIG. 6, a plan view of a portion of the battery cover 1 in the region of the terminal element 2 can be seen. It becomes clear that the hemispherical spacers 8 are formed as an integral part of the plastic battery cover 1 at a spacing from one another on a circumferential circumference. The fingers 10 of the connecting flank 4 which form an antirotation protection means can also be seen from the plan view of FIG. 6.

Those reviewing this disclosure will appreciate that various exemplary embodiments have been described herein. For example, a plastic battery cover 1 is described for closing a battery housing, having an underside U which points into the battery housing in the state where it is fitted onto the battery housing, and an upper side O which lies opposite, and having at least one metallic terminal element 2 which is guided through the battery cover 1. The region between the at least one terminal element 2 and the upper side O of the battery cover 1 is adapted in such a way that a gap between the terminal element 2 and the adjacent plastic of the battery cover 1 on the upper side is prevented after the volume reduction of the plastic in this region during the manufacture of the battery cover 1 by injection molding.

According to an exemplary embodiment, a plastic battery cover (1) for closing a battery housing includes an underside (U) which points into the battery housing in the state where it is fitted onto the battery housing, and an upper side (O) which lies opposite. The battery cover includes at least one metallic terminal element (2) which is guided through the battery cover (1). A connecting flank (4) protrudes in each case from the circumference of a terminal element (2) in a manner which adjoins the surface of the battery cover (1). The connecting flank (4) is configured in such a way that the region between the at least one terminal element (2) and the upper side (O) of the battery cover (1) is adapted in such a way that a gap between the terminal element (2) and the adjacent plastic of the battery cover is prevented after the volume reduction of the plastic in this region during the manufacture of the battery cover (1) by injection molding.

It is important to note that the construction and arrangement of the battery cover as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present invention as defined in the appended claims. Other substitutions, modifications, changes and omissions may be made in the design, operating conditions and arrangement of the exemplary embodiments without departing from the scope of the present inventions as expressed in the appended claims.

What is claimed is:

1. A plastic battery cover for closing a battery housing comprising:
   a top surface;
   a bottom surface;

at least one terminal extending through the battery cover; and an uppermost connecting flank extending from the at least one terminal, the uppermost connecting flank in contact with the battery cover;

wherein the uppermost flank is the flank closest to the top surface of the battery cover;

wherein the uppermost connecting flank is configured such that plastic rests on, an upper side of the connecting flank and avoids a gap between the terminal and the top surface of the battery cover;

wherein the uppermost connecting flank comprises an outer circumferential surface having a substantially flat surface; and wherein the uppermost connecting flank comprises an at least partially circumferential groove on the uppermost connecting flank's outer circumferential surface; and wherein the uppermost connecting flank is configured such that a region between the at least one terminal and the battery cover adjacent to the top surface of the battery cover is adapted to prevent formation of a gap between the terminal and an adjacent portion of the battery cover adjacent to the top surface of the battery cover after volume reduction of plastic in the region between the at least one terminal and the top surface of the battery cover during manufacture of the battery cover by injection molding.

2. The plastic battery cover of claim 1, wherein the uppermost connecting flank comprises a barb-shaped undercut for accommodating plastic in the undercut and avoiding a gap between the terminal and the top surface of the battery cover.

3. The plastic battery cover of claim 1, wherein the uppermost connecting flank is beveled with respect to the top surface of the battery cover in the region of the terminal which adjoins the top surface of the battery cover such that plastic rests on the beveled upper side of the connecting flank.

4. The plastic battery cover of claim 1, further comprising a circumferential notch provided in the region of the terminal which adjoins the top surface of the battery cover for accommodating plastic and avoiding a gap between the terminal and the top surface of the battery cover.

5. The plastic battery cover of claim 1, wherein the uppermost connecting flank comprises at least two fingers which protrude from the circumference of the at least one terminal that are configured to prevent rotation of the terminal.

6. The plastic battery cover of claim 1, wherein an outer face of the uppermost connecting flank is at least partially roughened and substantially the entire roughened surface is in direct contact with the plastic battery cover material.

7. The plastic battery cover of claim 1, wherein the outer face of the uppermost connecting flank is corrugated, scored, scaled or scarred and substantially the entire roughened surface is in direct contact with the plastic battery cover material.

8. The plastic battery cover of claim 1, further comprising a plastic ring pressed on the circumference of the at least one terminal.

9. The plastic battery cover of claim 8, wherein the plastic forming the cover is injection molded onto the plastic ring.

10. The plastic battery cover of claim 1, further comprising an antirotation protection feature provided between the top surface and the bottom surface of the battery cover comprising at least two fingers which protrude from the circumference of the at least one terminal.

11. The plastic battery cover of claim 1, further comprising a plastic annular bead integrally formed with the battery cover by injection molding, the plastic annular bead provided immediately adjacent to the at least one terminal on the top surface of the battery cover to at least partially enclose the terminal.

12. The plastic battery cover of claim 11, wherein the annular bead comprises slots.

13. The plastic battery cover of claim 1, wherein the at least one terminal is a terminal sleeve for receiving a terminal cylinder.

14. A lead acid battery, comprising:
a plastic housing subdivided into cells;
a plurality of electrode plates in the cells of the plastic housing;
an electrolyte provided in the cells;
a plastic battery cover coupled to the housing that comprises an upper surface, a lower surface, at least one terminal extending through the battery cover, and an uppermost connecting flank extending from the at least one terminal, the at least one connecting flank in contact with the battery cover;
wherein the uppermost flank is the flank closest to the top surface of the battery cover;
wherein the uppermost connecting flank is configured such that plastic rests on an upper side of the connecting flank and avoids a gap between the terminal and the top surface of the battery cover;
wherein the uppermost connecting flank comprises an outer circumferential surface having a substantially flat surface; and
wherein the uppermost connecting flank comprises an at least partially circumferential groove on the uppermost connecting flank's outer circumferential surface; and
wherein the uppermost connecting flank is configured such that a region between the at least one terminal and the battery cover adjacent to the top surface of the battery cover is adapted to prevent formation of a gap between the terminal and an adjacent portion of the battery cover adjacent to the top surface of the battery cover after volume reduction of plastic in the region between the at least one terminal and the top surface of the battery cover during manufacture of the battery cover by injection molding.

15. The lead acid battery of claim 14, wherein the uppermost connecting flank comprises a barb-shaped undercut for accommodating plastic in the undercut and avoiding a gap between the terminal and the top surface of the battery cover.

16. The lead acid battery of claim 14, wherein the uppermost connecting flank is beveled with respect to the top surface of the battery cover in the region of the terminal which adjoins the top surface of the battery cover such that plastic rests on an-the beveled upper side of the connecting flank.

17. The lead acid battery of claim 14, further comprising a circumferential notch provided in the region of the terminal which adjoins the top surface of the battery cover for accommodating plastic and avoiding a gap between the terminal and the top surface of the battery cover.

18. The lead acid battery of claim 14, wherein the uppermost connecting flank comprises at least two fingers which protrude from the circumference of the at least one terminal that are configured to prevent rotation of the terminal.

19. The lead acid battery of claim 14, wherein an outer face of the uppermost connecting flank is at least partially roughened and substantially the entire roughened surface is in direct contact with the plastic battery cover material.

20. The lead acid battery of claim 14, wherein the outer face of the uppermost connecting flank is corrugated, scored, scaled or scarred and substantially the entire roughened surface is in direct contact with the plastic battery cover material.

21. The lead acid battery of claim 14, further comprising a plastic ring pressed on the circumference of the at least one terminal.

22. The lead acid battery of claim 14, further comprising an antirotation protection feature provided between the top surface and the bottom surface of the battery cover comprising at least two fingers which protrude from the circumference of the at least one terminal.

23. The lead acid battery of claim 14, further comprising a plastic annular bead comprising slots that is integrally formed with the battery cover by injection molding, the plastic annular bead provided immediately adjacent to the at least one terminal on the top surface of the battery cover to at least partially enclose the terminal.

* * * * *